US012319808B2

(12) United States Patent
Kim et al.

(10) Patent No.: US 12,319,808 B2
(45) Date of Patent: Jun. 3, 2025

(54) THERMOPLASTIC RESIN COMPOSITION

(71) Applicant: LG CHEM, LTD., Seoul (KR)

(72) Inventors: Seong Kyun Kim, Daejeon (KR); Seo Hwa Kim, Daejeon (KR); Eun Jung Choi, Daejeon (KR); Byoung Il Kang, Daejeon (KR); Dong Kun Shin, Daejeon (KR); Yeong Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 711 days.

(21) Appl. No.: 17/609,249

(22) PCT Filed: Oct. 6, 2020

(86) PCT No.: PCT/KR2020/013594
§ 371 (c)(1),
(2) Date: Nov. 5, 2021

(87) PCT Pub. No.: WO2021/080215
PCT Pub. Date: Apr. 29, 2021

(65) Prior Publication Data
US 2022/0213307 A1    Jul. 7, 2022

(30) Foreign Application Priority Data
Oct. 25, 2019   (KR) ........................ 10-2019-0134003

(51) Int. Cl.
| C08L 25/12 | (2006.01) |
| C08K 3/013 | (2018.01) |
| C08K 3/08 | (2006.01) |
| C08K 9/12 | (2006.01) |
| C08L 23/06 | (2006.01) |
| C08L 23/12 | (2006.01) |
| C08L 51/04 | (2006.01) |

(52) U.S. Cl.
CPC .............. *C08L 25/12* (2013.01); *C08K 3/013* (2018.01); *C08K 3/08* (2013.01); *C08L 23/06* (2013.01); *C08K 2003/0806* (2013.01); *C08K 9/12* (2013.01); *C08L 23/12* (2013.01); *C08L 51/04* (2013.01); *C08L 2203/30* (2013.01); *C08L 2205/025* (2013.01); *C08L 2205/03* (2013.01); *C08L 2205/035* (2013.01); *C08L 2310/00* (2013.01)

(58) Field of Classification Search
CPC .......... C08L 25/12; C08L 55/02; C08L 51/04; C08L 23/0853; C08L 51/003; C08K 9/12; C08K 3/08
See application file for complete search history.

(56) References Cited

U.S. PATENT DOCUMENTS

| 5,455,300 A | 10/1995 | Smith |
| 2012/0129992 A1 | 5/2012 | Kang et al. |
| 2013/0023618 A1 | 1/2013 | Miyaki et al. |
| 2017/0321052 A1 | 11/2017 | Moriyasu et al. |
| 2020/0239682 A1 | 7/2020 | Ryoo et al. |

FOREIGN PATENT DOCUMENTS

| CN | 1119657 A | 4/1996 | |
| CN | 102627827 A | 8/2012 | |
| CN | 105860312 B | 4/2019 | |
| CN | 109836683 A | 6/2019 | |
| JP | S53-031747 | 9/1976 | |
| JP | H09-87480 A | 3/1997 | |
| JP | 2001-294742 | 10/2001 | |
| JP | 3991365 B2 | 10/2007 | |
| JP | 2011-168777 | 9/2011 | |
| JP | 5382893 B2 | 1/2014 | |
| JP | 2015-007159 | 1/2015 | |
| JP | 2015-017192 | 1/2015 | |
| KR | 96-4431 A | 2/1996 | |
| KR | 10-0572282 B1 | 4/2006 | |
| KR | 10-2008-0112842 A | 12/2008 | |
| KR | 10-2015-0124598 A | 11/2015 | |
| KR | 10-2017-0086074 A | 7/2017 | |
| KR | 20190035571 A | 4/2019 | |
| KR | 10-2019-0051560 A | 5/2019 | |
| WO | WO-0142356 A1 * | 6/2001 | ........... C08K 3/0033 |
| WO | WO-2004015006 A2 * | 2/2004 | ............. C08L 25/06 |
| WO | 2019/103519 A2 | 5/2019 | |

OTHER PUBLICATIONS

Japanese Office Action, dated Dec. 5, 2022, for Corresponding Japanese Patent Application No. JP2021566073, 5 pages.
International Search Report issued in corresponding International Patent Application No. PCT/KR2020/013594 dated Jan. 14, 2021.
Extended European Search Report for corresponding Application No. EP 20 87 8654 dated May 9, 2022, 6 pages.
Office Action issued on Oct. 30, 2023 for the corresponding Taiwanese patent application 109135449.
Office action dated Apr. 27, 2023 issued in corresponding Chinese Patent Application No. 202080030495.6.

* cited by examiner

*Primary Examiner* — Marc S Zimmer
*Assistant Examiner* — Surbhi M Du
(74) *Attorney, Agent, or Firm* — Morgan, Lewis & Bockius LLP

(57) ABSTRACT

Disclosed is a thermoplastic resin composition including a base resin having a diene-based rubber graft copolymer and a vinyl cyanide-aromatic vinyl-based copolymer, an olefin-based copolymer having a crystalline unit, and a metallic pigment.

12 Claims, No Drawings

THERMOPLASTIC RESIN COMPOSITION

CROSS-REFERENCE TO RELATED APPLICATIONS

This application claims the benefit of Korean Patent Application No. 10-2019-0134003, filed on Oct. 25, 2019, in the Korean Intellectual Property Office, the disclosure of which is incorporated herein in its entirety by reference.

TECHNICAL FIELD

The present invention relates to a thermoplastic resin composition, and particularly, to a thermoplastic resin composition from which a resin having excellent fluidity may be provided and an injection-molded product having excellent brightness, appearance quality, and chemical resistance may be provided.

BACKGROUND ART

Recently, research on a metallic resin obtained by adding a metallic pigment to a diene-based graft copolymer to allow plastic to exhibit a metallic color is gradually expanding.

However, there is a problem in that the fluidity of a resin significantly lowered when a metallic pigment is added to a diene-based graft copolymer. In addition, there is a problem in that a defect in appearance quality occurs in a section in which the thickness of a molded product prepared using a metallic resin changes or occurs at the end of the molded product due to a great difference in flow velocity between the metallic pigment and a polymer fluid.

Meanwhile, conventional studies to solve the above-described problem are not aimed to improving the physical properties of a resin itself, but aimed to improving the properties of only a molded product itself by controlling the conditions when a molded product is produced by molding a resin.

Accordingly, there is a demand for a thermoplastic resin composition from which a molded product having excellent physical properties such as appearance quality and chemical resistance can be provided without lowering the fluidity of the resin even if a metallic pigment is added to a diene-based graft copolymer.

PRIOR ART LITERATURE

Patent Literature (Patent literature 1) CN109836683A

DISCLOSURE OF THE INVENTION

Technical Problem

An aspect of the present invention provides a thermoplastic resin composition from which a resin having excellent fluidity may be provided and an injection-molded product having excellent brightness, appearance quality, and chemical resistance may be provided.

However, the problem to be solved by the present invention is not limited to the above-mentioned problems, and other problems that are not mentioned will be clearly understood by those skilled in the art from the following description.

Technical Solution

In order to solve the above problems, an embodiment of the present invention provides a thermoplastic resin composition including: a base resin having a diene-based rubber graft copolymer and a vinyl cyanide-aromatic vinyl-based copolymer; an olefin-based copolymer having a crystalline unit; and a metallic pigment.

Advantageous Effects

A thermoplastic resin composition according to the present invention may provide a resin having excellent fluidity and may provide an injection-molded product having excellent brightness, appearance quality, and chemical resistance.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the specification, when a part "includes" a component, this means that other components may be further included rather than excluding other components unless otherwise stated.

An embodiment of the present invention provides a thermoplastic resin composition including a base resin having a diene-based rubber graft copolymer and a vinyl cyanide-aromatic vinyl-based copolymer; an olefin-based copolymer having a crystalline unit; and a metallic pigment.

According to an embodiment of the present invention, the base resin may further include an acrylic rubber graft copolymer.

Hereinafter, the components of the thermoplastic resin composition according to an embodiment of the present invention will be described in detail.

1. Base Resin

1) Diene-Based Rubber Graft Copolymer

A diene-based rubber graft copolymer may provide excellent heat resistance, impact resistance, and processability to a thermoplastic resin composition.

The diene-based rubber graft copolymer may be obtained by graft copolymerization of a vinyl-based monomer to a diene-based rubber polymer, and preferably obtained by graft copolymerization of an aromatic vinyl-based monomer and a vinyl cyanide-based monomer to a diene-based rubber polymer.

The diene-based rubber polymer may be a polymerized product of a diene-based monomer, the diene-based monomer may be at least one selected from among 1,3-butadiene, isoprene, chloroprene, and piperylene, and specifically the diene-based monomer may be 1,3-butadiene.

The aromatic vinyl-based monomer may be at least one selected from among styrene, α-methyl styrene, α-ethyl styrene and p-methyl styrene, and specifically, the aromatic vinyl-based monomer may be styrene.

The vinyl cyanide-based monomer may be at least one selected from among acrylonitrile, methacrylonitrile, phenyl acrylonitrile and α-chloroacrylonitrile, and specifically the vinyl cyanide-based monomer may be acrylonitrile.

According to an embodiment of the present invention, the diene-based rubber graft copolymer may have a rubber particle size of 0.05 μm to 0.5 μm. When the rubber particle size of a diene-based rubber graft copolymer is within the above range, the heat resistance, impact resistance, and processability of the thermoplastic resin composition may be improved.

According to an embodiment of the present invention, the diene-based rubber graft copolymer may be contained in an amount of 10 parts by weight to 40 parts by weight with respect to 100 parts by weight of the base resin. Specifically, with respect to 100 parts by weight of the base resin, the amount of the diene-based rubber graft copolymer may be 10 parts by weight to 30 parts by weight, 10 parts by weight to 20 parts by weight, 10 parts by weight to 15 parts by weight, or 15 parts by weight to 20 parts by weight. When the amount of the diene-based rubber graft copolymer is within the above range, the heat resistance, impact resistance, and processability of the thermoplastic resin composition may be improved.

2) Vinyl Cyanide-Aromatic Vinyl-Based Copolymer

A vinyl cyanide-aromatic vinyl-based copolymer may provide excellent transparency, gloss, impact resistance, chemical resistance, and heat resistance to a thermoplastic resin composition.

The vinyl cyanide-aromatic vinyl-based copolymer may be obtained by copolymerization of an aromatic vinyl-based compound and a vinyl cyanide-based compound, and preferably obtained by copolymerization of an aromatic vinyl-based monomer and a vinyl cyanide-based monomer. The aromatic vinyl-based monomer and the vinyl cyanide-based monomer may be the same monomer as described in 1.1).

According to an embodiment of the present invention, the vinyl cyanide-aromatic vinyl-based copolymer may be contained in an amount of 60 parts by weight to 80 parts by weight with respect to 100 parts by weight of the base resin. Specifically, with respect to 100 parts by weight of the base resin, the amount of the vinyl cyanide-aromatic vinyl-based copolymer may be 70 parts by weight to 80 parts by weight, 75 parts by weight to 80 parts by weight, 77 parts by weight to 80 parts by weight, 75 parts by weight to 77 parts by weight or 70 parts by weight to 77 parts by weight. When the amount of the vinyl cyanide-aromatic vinyl-based copolymer is within the above range, the transparency, gloss, impact resistance, chemical resistance and heat resistance of the thermoplastic resin composition may be improved.

3) Acrylic Rubber Graft Copolymer

An acrylic rubber graft copolymer may provide excellent weather resistance, impact resistance, elongation, colorability, chemical resistance, processability, surface gloss property and whitening property to a thermoplastic resin composition.

The acrylic rubber graft copolymer may be obtained by graft copolymerization of a vinyl-based monomer to an acrylic rubber polymer, and preferably obtained by graft copolymerization of an aromatic vinyl-based monomer and a vinyl cyanide-based monomer to an acrylic rubber polymer. The acrylic rubber polymer may be prepared by crosslinking a (meth)acrylate monomer, preferably a C4-C10 alkyl (meth)acrylate-based monomer, and more preferably a butyl acrylate. The aromatic vinyl-based monomer and the vinyl cyanide-based monomer may be the same monomers described in 1. 1).

According to an embodiment of the present invention, the acrylic rubber graft copolymer may have a rubber particle size of 0.05 μm to 0.6 μm. When the rubber particle size of the acrylic rubber graft copolymer is within the above range, the weather resistance, impact resistance, elongation, colorability, chemical resistance, processability, surface gloss property and whitening property of the thermoplastic resin composition may be further improved.

According to an embodiment of the present invention, the acrylic rubber graft copolymer may be contained in an amount of 5 parts by weight to 20 parts by weight with respect to 100 parts by weight of the base resin. Specifically, with respect to 100 parts by weight of the base resin, the amount of the acrylic rubber graft copolymer may be 5 parts by weight to 15 parts by weight, 5 parts by weight to 10 parts by weight, 5 parts by weight to 8 parts by weight or 8 parts by weight to 10 parts by weight. When the amount of the acrylic rubber graft copolymer is within the above range, the elongation, weather resistance, chemical resistance, colorability, processability, surface gloss property and whitening property of the thermoplastic resin composition may be remarkably improved.

2. Olefin-Based Copolymer Having Crystalline Unit

An olefin-based copolymer having a crystalline unit has excellent fluidity and may improve the processability and chemical resistance of a thermoplastic resin composition. Specifically, the olefin-based copolymer having a crystalline unit may make it possible that the thermoplastic resin composition may form a resin having excellent fluidity, and that the thermoplastic resin composition may form a molded product having excellent brightness, appearance quality, and chemical resistance.

In addition, the olefin-based copolymer having a crystalline unit is included in the thermoplastic resin composition together with a metallic pigment, and thus improves the appearance characteristic of a resin and a molded product obtained from the composition. Specifically, the olefin-based copolymer having a crystalline unit is excellent in compatibility with a polymer carrier that may be included in the metallic pigment to be described later, and may maximize the alignment and dispersion of the metallic pigment in the thermoplastic resin, so that a molded product obtained from the thermoplastic resin composition may have an excellent appearance quality.

According to an embodiment of the present invention, the crystalline unit may be at least one unit selected from among an ethylene unit and a propylene unit, and preferably may be an ethylene unit.

According to an embodiment of the present invention, the olefin-based copolymer may include at least one functional group selected from among an acetate group and an acrylate group, and preferably include an acetate group. In this case, the olefin-based copolymer having a crystalline unit may have excellent compatibility with the base resin, and the thermoplastic resin composition may thus form a resin having excellent fluidity.

The olefin-based copolymer having a crystalline unit may be at least one copolymer selected from among an ethyl-vinyl acetate copolymer, an ethylene-ethyl acrylate copolymer, and an ethylene-butyl acrylate copolymer, and preferably be an ethyl-vinyl acetate copolymer. In this case, the fluidity of a resin prepared from the thermoplastic resin composition may be improved, and the thermoplastic resin composition makes it possible to improve the brightness, appearance quality, and chemical resistance of a molded product prepared from the composition.

According to an embodiment of the present invention, the olefin-based copolymer may be contained in an amount of 1 part by weight to 10 parts by weight with respect to 100 parts by weight of the base resin. Specifically, the amount of the olefin-based copolymer may be 1 part by weight to 5 parts by weight, or 5 parts by weight to 10 parts by weight, with respect to 100 parts by weight of the base resin. When the amount of the olefin-based copolymer is within the above range, the compatibility of the olefin-based copolymer with the base resin is excellent, thereby improving the appearance quality and chemical resistance of the molded product prepared from the thermoplastic resin composition.

3. Metallic Pigment

A metallic pigment may make it possible that a thermoplastic resin composition forms a molded product having an excellent brightness, appearance quality, and chemical resistance.

According to an embodiment of the present invention, the metallic pigment may include a metal flake and a polymer carrier. When the metallic pigment includes the polymer carrier, the polymer carrier has excellent compatibility with an olefin-based copolymer having a crystalline unit, and thus the alignment and dispersion of the metallic pigment may be maximized.

The metal flake may be at least one selected from among aluminum flake, zinc flake, copper flake, nickel flake and stainless steel flake. The metal flake may preferably be an aluminum flake, and in this case, the thermoplastic resin composition makes it possible to improve the brightness and appearance quality of a molded product prepared from the composition.

According to an embodiment of the present invention, the polymer carrier may be at least one selected from among a polyethylene carrier, a polymethylmethacrylate carrier and a styrene-acrylonitrile copolymer carrier. The polymer carrier may preferably be a polyethylene carrier, and most preferably a polyethylene wax carrier. In this case, the thermoplastic resin composition makes it possible to improve the brightness, appearance quality, and chemical resistance of the molded product prepared from the composition.

According to an embodiment of the present invention, the metallic pigment may be contained in an amount of 0.05 parts by weight to 12 parts by weight with respect to 100 parts by weight of the base resin. Specifically, with respect to 100 parts by weight of the base resin, the amount of the metallic pigment may be 0.1 parts by weight to 10 parts by weight, 1 part by weight to 10 parts by weight, 1 part by weight to 5 parts by weight, or 5 parts by weight to 10 parts by weight. When the amount of the metallic pigment is within the above range, the fluidity of a resin prepared from the thermoplastic resin composition may be improved, and the thermoplastic resin composition makes it possible to improve the appearance quality of a molded product produced from the composition. For example, it is possible to prevent flow marks or weld lines from occurring in a molded product, and to achieve a metal-like appearance color as desired.

Hereinafter, in order to describe the present invention in detail, detail description will be given with reference to examples. However, the examples according to the present invention may be modified in various other forms, and the scope of the present invention is not construed as being limited to the examples described below. The examples of the present specification are provided to more completely explain the present invention to those of ordinary skill in the art.

EXAMPLES AND COMPARATIVE EXAMPLES

The specifications of components used in Examples and Comparative Examples below are as follows.

(A) Diene-based rubber graft copolymer: an acrylonitrile-butadiene-styrene graft copolymer (DP270E, LG Chem Co.) having a rubber particle size of 0.05 μm to 0.5 μm was used.

(B) Vinyl cyanide-aromatic vinyl-based copolymer: a styrene-acrylonitrile copolymer (80HF, LG Chem Co.) containing an acrylonitrile in an amount of 24 wt % was used.

(C) Acrylic rubber graft copolymer: an acrylonitrile-styrene-acrylate graft copolymer (SA927, LG Chem Co.) having a rubber particle size of 0.05 μm to 0.6 μm was used.

(D) Olefin-based copolymer having a crystalline unit: an ethyl-vinyl acetate copolymer (EEA-28025, LG Chem Co.) was used.

(E) Metallic pigment:

(E-1) A metallic pigment (220-20-E, Silverline Co.) containing a polyethylene wax carrier was used.

(E-2) A metallic pigment (838-20-P, Silverline Co.) containing a polymethyl methacrylate carrier was used.

A thermoplastic resin composition was prepared by mixing the above-described components in amounts shown in Tables 1 to 3 below.

Experimental Example 1

Thermoplastic resin compositions of Examples and Comparative Examples were put into an extruder (cylinder temperature: 230° C.), then melted, mixed, and extruded to produce pellets, and the physical properties thereof were evaluated by the method described below, and the results are shown in Table 1 to 3.

1) Melt Index (MI) Measurement

According to ASTM D1238, the MI-4 made by GOTTFERT Co. was used to measure the weight of a resin after being melted for 10 minutes under conditions of a temperature of 220° C. and a load of 10 kg.

Experimental Example 2

A pellet prepared in Experimental Example 1 was injection-molded to prepare a specimen, and the physical properties thereof were evaluated by the method described below, and the results are shown in Table 1 to 3 below.

1) Color L Value Measurement

The color L value of the specimen was measured using a color meter (Ci7860, x-rite Co.).

2) Appearance Quality Evaluation

Since a mold with two gates was used for injection during injection molding, flow marks may occur. The appearance of the specimen was observed with the naked eyes and the appearance quality was evaluated according to the evaluation criteria below.

O: No or almost no flow mark

Δ: Flow mark marks are faintly visible

X: The area where the flow mark has occurred is clearly and deeply visible

3) Chemical Resistance Evaluation

According to ASTM D1693, the specimen is fixed to a strain jig of 1.5% at room temperature, then an isopropyl alcohol solution (concentration: 70%) was applied on the specimen, and after 10 minutes, the chemical resistance was evaluated according to the evaluation criteria below by observing the change of the specimen with the naked eye.

O: No change in the specimen

X: Cracks are observed or the specimen is completely broken

TABLE 1

|  | Example | | | | | | |
|---|---|---|---|---|---|---|---|
|  | 1 | 2 | 3 | 4 | 5 | 6 | 7 |
| (A) Diene-based rubber graft copolymer (parts by weight) | 15 | 15 | 15 | 15 | 15 | 15 | 15 |
| (B) Vinyl cyanide-aromatic vinyl-based copolymer (parts by weight) | 77 | 77 | 77 | 77 | 77 | 77 | 77 |
| (C) Acrylic rubber graft copolymer (parts by weight) | 8 | 8 | 8 | 8 | 8 | 8 | 8 |
| (D) Olefin-based copolymer having a crystalline unit (parts by weight) | 1 | 1 | 1 | 10 | 10 | 10 | 1 |
| (E) Metallic pigment (E-1) (parts by weight) | 1 | 10 | — | 1 | 10 | — | 12 |
| (E-2) | — | — | 10 | — | — | 10 | — |
| Melt Index (g/10 min) | 40 | 40 | 40 | 49 | 49 | 49 | 41 |
| Color L | 70 | 73 | 79 | 74 | 81 | 78 | 74 |
| Appearance quality | ○ | ○ | Δ | ○ | ○ | Δ | Δ |
| Chemical resistance | ○ | ○ | ○ | ○ | ○ | ○ | ○ |

TABLE 2

|  | Example | | | | | | | |
|---|---|---|---|---|---|---|---|---|
|  | 8 | 9 | 10 | 11 | 12 | 13 | 14 | 15 |
| (A) Diene-based rubber graft copolymer (parts by weight) | 15 | 15 | 15 | 15 | 15 | 15 | 15 | 15 |
| (B) Vinyl cyanide-aromatic vinyl-based copolymer (parts by weight) | 77 | 77 | 77 | 77 | 77 | 77 | 77 | 77 |
| (C) Acrylic rubber graft copolymer (parts by weight) | 8 | 8 | 8 | 8 | 8 | 8 | 8 | 8 |
| (D) Olefin-based copolymer having a crystalline unit (parts by weight) | 1 | 1 | 1 | 1 | 10 | 10 | 10 | 10 |
| (E) Metallic pigment (E-1) | 0.05 | 5 | — | — | 0.05 | 5 | — | — |
| (E-2) | — | — | 0.05 | 5 | — | — | 0.05 | 5 |
| Melt Index (g/10 min) | 40 | 40 | 40 | 40 | 49 | 49 | 49 | 49 |
| Color L | 69 | 72 | 69 | 73 | 73 | 76 | 73 | 77 |
| Appearance quality | ○ | ○ | ○ | ○ | ○ | ○ | ○ | ○ |
| Chemical resistance | ○ | ○ | ○ | ○ | ○ | ○ | ○ | ○ |

TABLE 3

|  | Comparative Example | | | |
|---|---|---|---|---|
|  | 1 | 2 | 3 | 4 |
| (A) Diene-based rubber graft copolymer (parts by weight) | 15 | 15 | 15 | 15 |
| (B) Vinyl cyanide-aromatic vinyl-based copolymer (parts by weight) | 77 | 77 | 77 | 77 |
| (C) Acrylic rubber graft copolymer (parts by weight) | 8 | 8 | 8 | 8 |
| (D) Olefin-based copolymer having a crystalline unit (parts by weight) | — | — | — | — |
| (E) Metallic pigment (E-1) | 10 | 12 | — | — |
| (E-2) | — | — | 10 | 12 |
| Melt Index (g/10 min) | 39 | 39 | 39 | 39 |
| Color L | 71 | 72 | 78 | 79 |
| Appearance quality | X | X | X | X |
| Chemical resistance | X | X | X | X |

Referring to Tables 1 to 3, from melt indexes and Color L values, it may be confirmed that the thermoplastic resin composition of Examples 1 to 15 including both an olefin-based copolymer having a crystalline unit and a metallic pigment may provide a resin having an equivalent or superior level of fluidity and also provide an injection-molded product having an equivalent or superior level of brightness, compared to the thermoplastic resin compositions of Comparative Examples 1 to 4. Specifically, it may be confirmed that Example 2 was superior to Comparative Example 1, Example 3 was superior to Comparative Example 3, and Example 7 was superior to Comparative Example 2 in terms of fluidity and brightness.

In addition, it may be confirmed that the thermoplastic resin composition of Examples 1 to 15 may provide an injection-molded product having a more excellent appearance quality and chemical resistance than the thermoplastic resin composition of Comparative Examples 1 to 4 which do not contain an olefin-based copolymer having a crystalline unit.

In addition, from Examples 1 to 15, it may be confirmed that both the color L value and the appearance quality may be improved when a metallic pigment is included in an appropriate range.

Therefore, it may be seen that the thermoplastic resin composition according to an embodiment of the present invention may provide a resin with excellent fluidity, and also provide a molded product with excellent brightness, appearance quality and chemical resistance.

The invention claimed is:

1. A thermoplastic resin composition comprising:
   a base resin including:
      a diene-based rubber graft copolymer;
      an acrylic rubber graft copolymer, wherein the acrylic rubber graft copolymer is obtained by graft copolymerization of a vinyl-based monomer to an acrylic rubber polymer, or obtained by graft copolymerization of an aromatic vinyl-based monomer and a vinyl cyanide-based monomer to an acrylic rubber polymer; and
      a vinyl cyanide-aromatic vinyl-based copolymer;
   an olefin-based copolymer having a crystalline unit, wherein the crystalline unit is at least one selected from among an ethylene unit and a propylene unit; and
   a metallic pigment, wherein the metallic pigment includes a metal flake and a polymer carrier,
   wherein the acrylic rubber graft copolymer is contained in an amount of 5 parts by weight to 15 parts by weight with respect to 100 parts by weight of the base resin.

2. The thermoplastic resin composition of claim 1, wherein the diene-based rubber graft copolymer has a rubber particle size of 0.05 μm to 0.5 μm.

3. The thermoplastic resin composition of claim 1, comprising the diene-based rubber graft copolymer in an amount of 10 parts by weight to 40 parts by weight with respect to 100 parts by weight of the base resin.

4. The thermoplastic resin composition of claim 1, comprising the vinyl cyanide-aromatic vinyl-based copolymer in an amount of 60 parts by weight to 80 parts by weight with respect to 100 parts by weight of the base resin.

5. The thermoplastic resin composition of claim 1, wherein the acrylic rubber graft copolymer has a rubber particle size of 0.05 μm to 0.6 μm.

6. The thermoplastic resin composition of claim 1, wherein the olefin-based copolymer includes at least one functional group selected from among an acetate group and an acrylate group.

7. The thermoplastic resin composition of claim 1, comprising the olefin-based copolymer in an amount of 1 part by weight to 10 parts by weight with respect to 100 parts by weight of the base resin.

8. The thermoplastic resin composition of claim 1, wherein the polymer carrier is at least one selected from among a polyethylene carrier, a polymethyl methacrylate carrier, and a styrene-acrylonitrile copolymer carrier.

9. The thermoplastic resin composition of claim 1, comprising the metallic pigment in an amount of 0.05 parts by weight to 12 parts by weight with respect to 100 parts by weight of the base resin.

10. The thermoplastic resin composition of claim 1, comprising:
   the vinyl cyanide-aromatic vinyl-based copolymer in an amount of 70 parts by weight to 80 parts by weight with respect to 100 parts by weight of the base resin,
   the acrylic rubber graft copolymer is contained in an amount of 5 parts by weight to 10 parts by weight with respect to 100 parts by weight of the base resin, and
   the diene-based rubber graft copolymer in an amount of 10 parts by weight to 20 parts by weight with respect to 100 parts by weight of the base resin.

11. The thermoplastic resin composition of claim 1, wherein the olefin-based copolymer includes an acetate group, and
   wherein the polymer carrier is a polyethylene carrier, a polymethyl methacrylate carrier, or both.

12. The thermoplastic resin composition of claim 1, wherein the polymer carrier is a polymethyl methacrylate carrier.

\* \* \* \* \*